United States Patent
Guo

(10) Patent No.: US 12,069,587 B2
(45) Date of Patent: Aug. 20, 2024

(54) METHOD FOR DETERMINING A TRANSMISSION POWER OF AN UPLINK TRANSMISSION, USER EQUIPMENT, AND COMPUTER READABLE MEDIUM

(71) Applicant: GUANGDONG OPPO MOBILE TELECOMMUNICATIONS CORP., LTD., Guangdong (CN)

(72) Inventor: Li Guo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 316 days.

(21) Appl. No.: 17/456,505

(22) Filed: Nov. 24, 2021

(65) Prior Publication Data

US 2022/0086769 A1 Mar. 17, 2022

Related U.S. Application Data

(63) Continuation of application No. PCT/CN2020/127075, filed on Nov. 6, 2020.

(60) Provisional application No. 62/931,668, filed on Nov. 6, 2019.

(51) Int. Cl.
| | |
|---|---|
| *H04W 52/24* | (2009.01) |
| *H04B 7/06* | (2006.01) |
| *H04L 5/00* | (2006.01) |
| *H04W 52/14* | (2009.01) |

(52) U.S. Cl.
CPC ......... *H04W 52/242* (2013.01); *H04L 5/0048* (2013.01); *H04W 52/146* (2013.01); *H04B 7/0626* (2013.01)

(58) Field of Classification Search
CPC .................................................. H04W 52/242
See application file for complete search history.

(56) References Cited

U.S. PATENT DOCUMENTS

2014/0064251 A1 3/2014 Skov et al.

FOREIGN PATENT DOCUMENTS

| CN | 203891167 A | 6/2014 |
|---|---|---|
| CN | 110383905 A | 10/2019 |
| WO | 2012149661 A1 | 11/2012 |

OTHER PUBLICATIONS

Second Office Action for Chinese Application No. 202110969678.0 issued Feb. 1, 2023. 8 pages with English translation.
Third Office Action for Chinese Application No. 202110969678.0 issued Apr. 14, 2023. 7 pages with English translation.
Extended European Search Report for European Application No. 20886026.2 issued Apr. 25, 2022. 7 pages.
Sharp "Correction on UL power control" R1-1902652; 3GPP TSG-RAN1 Meeting #96; Athens, Greece; Feb. 25-Mar. 1, 2019. 4 pages.

(Continued)

*Primary Examiner* — Hsinchun Liao
(74) *Attorney, Agent, or Firm* — Perkins Coie LLP

(57) ABSTRACT

A method, a User Equipment, a computer program and a computer readable medium for determining a transmission power of an uplink transmission. The method includes: determining, by a User Equipment (UE), a Reference Signal (RS) resource index providing a periodic RS resource; calculating, by the UE, a downlink pathloss estimate using the RS resource index; determining, by the UE, the transmission power of the uplink transmission based on the downlink pathloss estimate.

20 Claims, 1 Drawing Sheet

(56) References Cited

OTHER PUBLICATIONS

ZTE "Draft CR on typos and misalignments of power control" R1-1906259; 3GPP TSG RAN WG1 Meeting #97; Reno, USA; May 13-17, 2019. 8 pages.
Examination Report for European Application No. 20886026.2 issued Jan. 25, 2023. 3 pages.
First Office Action for Chinese Application No. 202110969678.0 issued Nov. 15, 2022. 10 pages with English translation.
International Search Report Mailed Jan. 27, 2021 in Application No. PCT/CN2020/127075, 2 pp.
3GPP TS 38.211, 3rd Generation Partnership Project; Technical Specification Group Radio Access Network; NR; Physical Channels and modulation, Release 15, Mar. 2019, 96 pp.
3GPP TS 38.212, 3rd Generation Partnership Project; Technical Specification Group Radio Access Network; NR; Multiplexing and channel coding, Release 15, Mar. 2019, 101 pp.
3GPP TS 38. 213, 3rd Generation Partnership Project; Technical Specification Group Radio Access Network; NR; Physical layer procedures for control, Release 15, Mar. 2019, 104 pp.
3GPP TS 38.214, 3rd Generation Partnership Project; Technical Specification Group Radio Access Network; NR; Physical layer procedures for data, Release 15, Mar. 2019, 103pp.
3GPP TS 38.215, 3rd Generation Partnership Project; Technical Specification Group Radio Access Network; NR; Physical layer measurements, Release 15, Jun. 2019.
3GPP TS 38.321, 3rd Generation Partnership Project; Technical Specification Group Radio Access Network; NR; Medium Access Control (MAC) protocol specification (Release 15), Mar. 2019.
3GPP TS 38.331, 3rd Generation Partnership Project; Technical Specification Group Radio Access Network; NR; Radio Resource Control (RRC) protocol specification (Release 15), Mar. 2019.

METHOD FOR DETERMINING A TRANSMISSION POWER OF AN UPLINK TRANSMISSION, USER EQUIPMENT, AND COMPUTER READABLE MEDIUM

CROSS-REFERENCE TO RELATED APPLICATION

The present application is a continuation application of International Application No. PCT/CN2020/127075, filed on Nov. 6, 2020, which claims the priority of US provisional application U.S. 62/931,668, filed on Nov. 6, 2019. The present application claims priority and the benefit of the above-identified applications and the above-identified applications are incorporated by reference herein in their entireties.

TECHNICAL FIELD

The present disclosure relates to communication technology, in particular to a transmission power determination.

BACKGROUND

The statements in this section merely provide information related to the present disclosure and may not constitute prior art. Further, the content in this section may be used to define a concept related to the disclosure.

New Radio (NR) in 5G system supports uplink power control on uplink Physical Uplink Control Channel (PUCCH) transmission and Sounding Reference Signal (SRS) transmission. For an uplink transmission, the UE may calculate the transmit power as:

$$P=\min\{P_{CMAX}, \{P_0+\alpha \times PL+g+10\log_{10}M+\Delta\}\}.$$

$P_{CMAX}$ is the maximal allowed transmit power. $P_0$ is a target received signal power level of an open-loop power control operation expected by the network side. The choice of $P_0$ is based on an expected target Signal to Interference plus Noise Ratio (SINR) and a level of interference at the network side. A larger value of $P_0$ means a higher uplink transmit power and thus a greater SINR value at the receiver side, but it could cause more interference to other cells. PL is a pathloss estimate. The pathloss is estimated based on measuring some downlink reference signals (RS). The pathloss is calculated as pathloss=reference signal power−L3-filtered RSRP, wherein the L3-filtered RSRP is a Reference Signal Received Power (RSRP) value that is calculated and filtered in RRC layer, as used in 3GPP specification. $\alpha$ is a pathloss compensation factor. g is a power control adjustment state for a closed-loop power control operation. $10\log_{10}M$ is a power adjustment parameter that takes into account the size of a bandwidth of a resource allocation of the uplink transmission, and $\Delta$ is a power control adjustment parameter related to uplink transmission format, for example, a Modulation and Coding Scheme (MCS) level used by the PUCCH transmission. In the Radio Resource Control (RRC) configuration of the PUCCH and the SRS, a downlink reference signal (for example, Channel State Information-Reference Signal (CSI-RS) resource or Synchronisation Signal/Physical Broadcast CHannel (SS/PBCH) block) is configured as pathloss reference signal that is used to estimate the pathloss for uplink power control.

SUMMARY

A method, a User Equipment, a computer program and a computer readable medium for determining a transmission power of an uplink transmission.

BRIEF DESCRIPTION OF THE DRAWINGS

The drawings are used merely for illustration purposes but not for limiting the disclosure.

DETAILED DESCRIPTION

Figure 1:
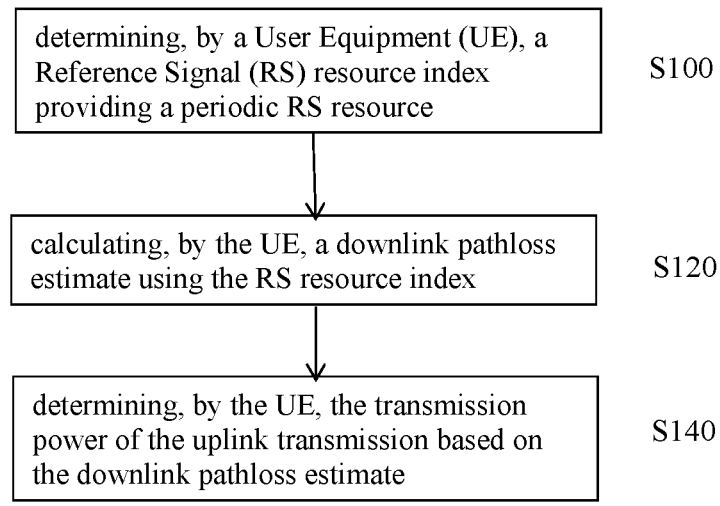
FIG. 1 shows a flow chart of a method.

For SRS power control, one or more power control parameters including information of a pathloss reference signal are configured per SRS resource set. In an SRS resource set, the UE may be configured with one or more SRS resources. For one transmission of each SRS resource in the set, the UE may use the one or more power control parameters including the information of the pathloss reference signal to determine the transmit power for that SRS resource. Particularly, in the RRC configuration of one SRS resource set SRS config, the one or more power control parameters including the information of the pathloss reference signal may be configured as follows:

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet)) OF
SRS-ResourceId   OPTIONAL, -- Cond Setup
    resourceType                CHOICE {
        aperiodic                   SEQUENCE {
            aperiodicSRS-ResourceTrigger    INTEGER (1..maxNrofSRS-TriggerStates-1),
            csi-RS                          NZP-CSI-RS-ResourceId                   OPTIONAL, -
- Cond NonCodebook
            slotOffset                      INTEGER (1..32)                         OPTIONAL, --
Need S
            ...,
            [[
            aperiodicSRS-ResourceTriggerList-v1530      SEQUENCE (SIZE(1..maxNrofSRS-
TriggerStates-2))
                                    OF INTEGER (1..maxNrofSRS-TriggerStates-1)
OPTIONAL -- Need M
            ]]
        },
        semi-persistent             SEQUENCE {
            associatedCSI-RS            NZP-CSI-RS-ResourceId
OPTIONAL, -- Cond NonCodebook
            ...
        },
```

```
    periodic                SEQUENCE {
        associatedCSI-RS                NZP-CSI-RS-ResourceId
OPTIONAL, -- Cond NonCodebook
        ...
    }
},
    usage               ENUMERATED {beamManagement, codebook, nonCodebook,
antennaSwitching},
    alpha               Alpha                               OPTIONAL, -- Need S
    p0                  INTEGER (-202..24)                  OPTIONAL, --
Cond Setup
    pathlossReferenceRS         CHOICE {
        ssb-Index               SSB-Index,
        csi-RS-Index            NZP-CSI-RS-ResourceId
    }                                                       OPTIONAL, -- Need M
    srs-PowerControlAdjustmentStates    ENUMERATED { sameAsFci2,
separateClosedLoop}     OPTIONAL, -- Need S
}
``` where the RRC parameter pathlossReferenceRS configures a CSI-RS resource index or SS/PBCH block index that provides the downlink reference signal resource index for pathloss estimate.

For a PUCCH resource, an RRC parameter PUCCH-SpatialRelationInfo is used to provide a reference signal (for example, an CSI-RS or SS/PBCH block or SRS resource) that provides spatial relation info or spatial relation information for that PUCCH resource and a downlink reference signal (CSI-RS or SSB) that provides a pathloss reference signal for that PUCCH resource, which may be shown in the below Table.

```
PUCCH-SpatialRelationInfo ::=       SEQUENCE {
    pucch-SpatialRelationInfoId         PUCCH-SpatialRelationInfoId,
    servingCellId           ServCellIndex                       OPTIONAL,
-- Need S
    referenceSignal             CHOICE {
        ssb-Index               SSB-Index,
        csi-RS-Index            NZP-CSI-RS-ResourceId,
        srs                 SEQUENCE {
                    resource            SRS-ResourceId,
                    uplinkBWP               BWP-Id
                }
    },
    pucch-PathlossReferenceRS-Id            PUCCH-PathlossReferenceRS-Id,
    p0-PUCCH-Id                 P0-PUCCH-Id,
    closedLoopIndex             ENUMERATED { i0, i1 }
}
```

So, if a PUCCH resource is not configured with a reference signal that provides spatial relation info, the PUCCH is not configured with a pathloss RS, either.

When a PUCCH resource is not configured with a reference signal that provides spatial relation info, the UE may apply a default spatial relation info on that PUCCH resource. When the UE applies default spatial relation info on a PUCCH resource, which pathloss RS shall be used by the UE is to be specified.

In the configuration of SRS, the spatial relation info is configured per SRS resource while pathloss RS is configured per SRS resource set. When an SRS resource is not configured with spatial relation info, the UE may apply a default spatial relation info on that SRS resource, where the pathloss RS used by the UE is to be specified.

In an example, if a first PUCCH resource is not configured with spatial relation info, that is, if a UE is not provided or configured with spatial relation info, the UE may use a default spatial relation info, which may also be called as a spatial setting for the PUCCH transmission, to determine the spatial domain transmit filter for the PUCCH transmission on the first PUCCH resource. The default spatial relation info may be determined as at least one of the follows:

A reference signal configured for QCL-type D in the Transmission Configuration Indicator (TCI)-state configured to the COntrol REsource SET (CORESET) with the lowest ID in a most recent monitored downlink (DL) slot, with respect to the transmission in the first PUCCH resource.

The reference signal configured as QCL-type D in the TCI-state configured to the CORESET with a lowest ID in an active Downlink Bandwidth Part (DL BWP).

The reference signal configured as QCL-type D in the TCI-state configured to the CORESET with a largest ID in the active DL BWP.

The lowest TCI-state ID among all the TCI-states activated by MAC Control Element (CE) for a Physical Downlink Shared Channel (PDSCH) transmission in the active BWP.

QCL refers to Quasi co-location, which is a known concept in LTE and 5G and QCL related information can be obtained, e.g., from 3GPP TS38.214. It should be noted that according to the known concept of the QCL, it is basically equivalent to state, e.g., an RS is configured "as" or "for" QCL-typeD or an RS is provided with QCL-typeD.

If a UE is not configured with spatial relation info for a first PUCCH resource but the UE is configured with a plurality of reference signal resource indexes as the pathloss RSs for PUCCH transmission, the UE may use one of those signal resource indexes configured as the pathloss RSs as the spatial relation info for the first PUCCH resource. For example, the UE may use the first entry of those signal resource indexes configured as the pathloss RSs as the spatial relation info for the first PUCCH resource.

If the UE is not provided with PUCCH-SpatialRelation-Info and the UE is provided with pathlossReferenceRSs, the UE may obtain the referenceSignal value in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking. The UE may use the RS corresponding to the determined referenceSignal value to derive the spatial domain transmission filter for the PUCCH transmission.

If a first PUCCH resource is not configured with spatial relation info, that is, if a UE is not provided or configured with spatial relation info, the UE may be requested to apply a default spatial relation info, i.e., spatial setting for the PUCCH transmission, as described above. When a default spatial relation info is applied on the first PUCCH resource, the UE may determine the RS for measuring pathloss used for calculating transmit power of PUCCH transmission on the first PUCCH resource based one or more of the followings:

1) If the UE is provided with a list of pathloss RSs for PUCCH, the UE may use one of those RSs to calculate the pathloss used for calculating transmit power of the PUCCH transmission on the first PUCCH resource.

2) If the UE is provided with a list of pathloss RSs for PUCCH, the UE may use the first entry of those RSs to calculate the pathloss used for calculating transmit power of the PUCCH transmission on the first PUCCH resource.

3) If the UE is provided with a list of pathloss RSs for PUCCH, the UE may use one of those RSs that is QCLed with the reference signal resource (which may be a CSI-RS resource) contained in the default spatial relation info to calculate the pathloss used for calculating transmit power of the PUCCH transmission on the first PUCCH resource. In this context, an RS that is QCLed with a reference signal resource means the reference signal resource provides QCL information to the RS.

4) If the UE is not provided with a pathloss reference configuration, e.g., a list of pathloss RSs for PUCCH, the UE may use the CSI-RS resource contained in the default spatial relation info to measure the pathloss used for calculating transmit power of PUCCH in the first PUCCH resource if the CSI-RS resource is a periodic CSI-RS resource.

5) If the UE is not provided with a list of pathloss RSs for PUCCH and the CSI-RS resource contained in the default spatial relation info is not a periodic CSI-RS resource, the UE may use the SSB used to obtain the MIB to calculate pathloss for calculating transmit power of PUCCH transmission in the first PUCCH resource.

For example, if a UE is not provided PUCCH-SpatialRelationInfo, a spatial setting for a dedicated PUCCH transmission in FR2 is same as a TCI state or a QCL assumption for the CORESET with a lowest ID in a most recent slot or is same as the TCI state with a lowest ID among the TCI-states activated for PDSCH reception if no CORESET is configured for PDCCH monitoring in the serving cell. FR2 refers to Frequency Range 2, and in an FR2 system the PUCCH transmission needs spatial setting information.

If the UE is provided with pathlossReferenceRSs in PUCCH-PowerControl, the UE may obtain the referenceSignal value $q_d$ in PUCCH-PathlossReferenceRS from the pucch-PathlossReferenceRS-Id with index 0 in PUCCH-PathlossReferenceRS where the RS resource is either on a same serving cell or, if provided, on a serving cell indicated by a value of pathlossReferenceLinking. The UE may use the RS resource index $q_d$ to estimate the downlink pathloss for determining transmit power of PUCCH transmission.

If the UE is provided with pathlossReferenceRSs in PUCCH-PowerControl, the UE may obtain the referenceSignal value $q_d$ in PUCCH-PathlossReferenceRS so that the RS resource index $q_d$ is same as the RS resource index contained in the spatial setting for the PUCCH transmission or is QCLed with the RS resource index contained in the spatial setting for the PUCCH transmission. The UE may use the RS resource index $q_d$ to estimate the downlink pathloss for determining transmit power of PUCCH transmission.

If the UE is not provided with pathlossReferenceRSs and if the RS resource index contained in the spatial setting for the PUCCH transmission is a periodic CSI-RS or SSB, the UE may use the RS resource index contained in the spatial setting for PUCCH transmission to estimate the downlink pathloss for determining transmit power of PUCCH transmission.

If the UE is not provided with pathlossReferenceRSs and if the RS resource index contained in the spatial setting for the PUCCH transmission is not a periodic CSI-RS or SSB, the UE may use the SSB used to obtain MIB to estimate the downlink pathloss for determining transmit power of PUCCH transmission.

In another example, if a first SRS resource is not configured with spatial relation info, that is, if a UE is not configured or provided spatialRelationInfo for SRS resource, the UE may use a default spatial relation info, which may also be called as spatial setting for SRS transmission or SRS resource, to determine the spatial domain transmit filter for the transmission of the first SRS resource. The default spatial relation info may be determined as at least one of the follows:

The reference signal configured for QCL-type D in the TCI-state configured to the CORESET with a lowest ID in a most recent monitored DL slot, with respect to the transmission in the first SRS resource.

The reference signal configured as QCL-type D in the TCI-state configured to the CORESET with a lowest ID in the active DL BWP.

The reference signal configured as QCL-type D in the TCI-state configured to the CORESET with a largest ID in the active DL BWP.

The lowest TCI-state ID among all the TCI-states activated by MAC CE for the PDSCH transmission in the active BWP.

If a higher layer parameter spatialRelationInfo is not configured for a SRS resource but if a UE is provided with the higher layer parameter pathlossReferenceRS associated with for the SRS resource set in which the SRS resource is configured, the UE may use the RS resource provided by pathlossReferenceRS to determine the spatial domain transmission filter for the transmission of the SRS resource. In other word, the UE may transmit the target SRS resource with the same spatial domain spatial transmission filter used for the reception of the RS resource provided by the higher layer parameter pathlossReferenceRS.

If the higher layer parameter spatialRelationInfo is not configured for a SRS resource and if the higher layer parameter pathlossReferenceRS associated with for the SRS resource set is not provided, if the UE is provided with higher layer parameter SRS-pathlossReferenceRS for SRS resource, the UE may use the RS resource index corresponding to the SRS-PathlossReferenceRS-Id=0 in the list of SRS-pathlossReferenceRS as the spatial relation info for the SRS resource. In other word, the UE may transmit the SRS resource with the same spatial domain transmission filter used for the reception of RS resource index corresponding to the SRS-PathlossReferenceRS-Id=0 in the list of SRS-pathlossReferenceRS.

If a first SRS resource is not provided with spatial relation info, that is, if a UE is not configured or provided spatialRelationInfo for SRS resource, the UE may be requested to determine a default spatial relation info for the SRS resource, i.e., the spatial setting for the SRS transmission or SRS resource, according to the method described above. When a default spatial relation info is applied to an SRS resource, the UE may use one or more of the following methods to determine a pathloss RS for calculating transmit power of the first SRS resource:

- If the UE is provided with a list of pathloss RSs for SRS resource, the UE may use one of those RSs to calculate the pathloss used in calculating transmit power of the transmission on the first SRS resource.
- If the UE is provided with a list of pathloss RSs for SRS resource, the UE may use the first entry of those RSs to calculate the pathloss used for calculating transmit power of the transmission on the first SRS resource.
- If the UE is provided with a list of pathloss RSs for SRS, the UE may use one of those RSs that is QCLed with the reference signal resource (which may be a CSI-RS resource) contained in the default spatial relation info to calculate the pathloss used for calculating transmit power of the SRS transmission on the first SRS resource.
- If the UE is provided with pathloss RS for the SRS resource set in which the first SRS resource is configured, the UE may use the configured pathloss RS to calculate the downlink pathloss for determining transmit power of the transmission of the first SRS resource.
- If the UE is not provided with pathloss RS, and if the RS resource contained in the default spatial relation info applied to the SRS resource is a periodic CSI-RS resource, the UE may use the RS resource contained in the default spatial relation info to calculate the downlink pathloss for determining transmit power of the transmission of the first SRS resource.

For an SRS resource set, if the UE is not provided with pathloss RS, i.e., not provided an SRS pathloss reference, and if all the SRS resources in the SRS resource set are not provided with spatial relation info and the UE applies default spatial relation info on the SRS resources,

- If the RS resource contained in the default spatial relation info is a periodic CSI-RS resource, the UE may use the RS resource contained in the default spatial relation info to measure downlink pathloss for determining transmit power of SRS resource.
- If the RS resource contained in the default spatial relation info is a semi-persistent or aperiodic CSI-RS resource, the UE may use the SSB used to obtain MIB to measure downlink pathloss for determining transmit power if SRS resource.

For example, if a UE is not provided spatialRelationInfo for SRS resource, a spatial setting for a SRS transmission in FR2 is same as a TCI state or a QCL assumption for the CORESET with a lowest ID in a most recent slot or is same as the TCI state with lowest ID among the TCI-states activated for PDSCH reception if no CORESET is configured for PDCCH monitoring in the serving cell.

If the UE is provided with SRS-pathlossReferenceRS for SRS resources, the UE may obtain the referenceSignal value $q_d$ in SRS-pathlossReferenceRS from the SRS-pathlossReferenceRS-Id with index 0 where the RS resource is either on a same serving cell or, if provided, on a serving cell indicated by a value of pathlossReferenceLinking. The UE may use the RS resource index $q_d$ to estimate the downlink pathloss for determining transmit power of SRS transmission.

If the UE is provided with SRS-pathlossReferenceRS, the UE may obtain the referenceSignal value $q_d$ in SRS-pathlossReferenceRS so that the RS resource index $q_d$ is same as the RS resource index contained in the spatial setting for the SRS resource or is QCLed with the RS resource index contained in the spatial setting for the SRS resource. The UE may use the RS resource index $q_d$ to estimate the downlink pathloss for determining transmit power of SRS transmission.

If the UE is not provided with SRS-pathlossReferenceRS for SRS or pathlossReferenceRS in the SRS resource set, and if the RS resource index contained in the spatial setting for the SRS resource is a periodic CSI-RS or SSB, the UE may use the RS resource index contained in the spatial setting for SRS resource to estimate the downlink pathloss for determining transmit power of SRS transmission.

If the UE is not provided with SRS-pathlossReferenceRS for SRS or pathlossReferenceRS in the SRS resource set and if the RS resource index contained in the spatial setting for the SRS resource is not a periodic CSI-RS or SSB, the UE may use the SSB used to obtain MIB to estimate the downlink pathloss for determining transmit power of SRS transmission.

If a UE transmits SRS on active UL BWP b of carrier f of serving cell c using SRS power control adjustment state with index l, the UE may determine the SRS transmission power $P_{SRS,b,f,c}(i,q_s,l)$ in SRS transmission occasion i as $$P_{SRS,b,f,c}(i, q_s, l) = \min\begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} [dBm]$$

Where $PL_{b,f,c}(q_d)$ is a downlink pathloss estimate in dB calculated by the UE using RS resource index $q_d$ as described in Subclause 7.1.1 in TS 38.213 for the active DL BWP of serving cell c and SRS resource set $q_s$. The RS resource index $q_d$ is provided by pathlossReferenceRS associated with the SRS resource set $q_s$ and is either an ssb-Index providing an SS/PBCH block index or a csi-RS-Index providing a CSI-RS resource index. If a UE is provided SRS-PathlossReferenceRS, a MAC CE may provide by SRS-PathlossReferenceRS-Id a corresponding RS resource index $q_d$ for SRS resource set $q_s$:

- If the UE is not provided pathlossReferenceRS or SRS-PathlossReferenceRS, or before the UE is provided dedicated higher layer parameters, the UE may calculate $PL_{b,f,c}(q_d)$ using a RS resource obtained from the SS/PBCH block that the UE uses to obtain MIB.

If the UE is provided with SRS-PathlossReferenceRS and is not provided with pathlossReferenceRS, the UE may calculate $PL_{b,f,c}(q_d)$ using an RS resource index obtained from the SRS-PathlossReferenceRS-Id with index 0 in SRS-PathlossReferenceRS.

If the UE is provided with SRS-PathlossReferenceRS and is not provided with pathlossReferenceRS, the UE may use one RS resource index obtained from one entry in SRS-PathlossReferenceRS to calculate $PL_{b,f,c}(q_d)$.

In view of the above:

For a PUCCH resource: if a default spatial relation info is applied and the reference signal contained in the default spatial relation info is a periodic CSI-RS or SS/PBCH block, the UE may use that periodic CSI-RS resource or SS/PBCH block as the pathloss RS for that PUCCH resource, otherwise, the UE may use the SSB used to obtain MIB to estimate the pathloss.

For an SRS resource: if spatial relation info is not configured, the pathloss RS configured to the SRS set or the $1^{st}$ entry of the list of the pathloss RSs configured for SRS resource is used as the default spatial relation info for the SRS resource.

When default spatial relation info is applied to an SRS resource, the UE may use the following alternatives for pathloss RS:

The $1^{st}$ entry in the list of pathloss RSs configured for SRS;

The RS resource index contained in the default spatial relation info for the SRS resource if that RS resource is a periodic CSI-RS.

The SSB if the RS resource in the default spatial relation info is semi-persistent or aperiodic CSI-RS.

In view of the above, a UE determines a Reference Signal (RS) resource index providing a periodic RS resource; calculates a downlink pathloss estimate using the RS resource index; and determines the transmission power of the uplink transmission based on the downlink pathloss estimate, as steps S100, S120 and S140 shown in FIG. 1.

When the uplink transmission is an SRS transmission, and if the UE is not provided a pathloss reference configuration or an SRS pathloss reference configuration and is not provided spatial relation information for the SRS transmission, the UE may determine an RS resource index providing a periodic RS resource with QCL-type D in an active Physical Downlink Shared Channel Transmission Configuration Indicator (PDSCH TCI) state with a lowest index in an active Downlink Bandwidth Part (DL BWP), if COntrol REsource SET (CORESET) is not provided in the active DL BWP of a serving cell of the UE.

As an example, if a first SRS resource is not provided with spatial relation info, that is, if a UE is not configured or provided spatialRelationInfo for SRS resource, the UE may be requested to determine a default spatial relation info for the SRS resource, i.e., the spatial setting for the SRS transmission or SRS resource. If the RS resource index contained in a spatial setting for an SRS resource is a periodic CSI-RS, the UE uses the RS resource index contained in the spatial setting for the SRS transmission. If the UE is not provided with pathloss RS, and if the RS resource contained in the default spatial relation info applied to the SRS resource is a periodic CSI-RS resource, the UE may use the RS resource contained in the default spatial relation info to calculate the downlink pathloss for determining transmit power of the transmission of the first SRS resource. For an SRS resource set, if the UE is not provided with pathloss RS, i.e., not configured an SRS pathloss reference, and if all the SRS resources in the SRS resource set are not provided with spatial relation info and the UE applies default spatial relation info on the SRS resources, and if the RS resource contained in the default spatial relation info is a periodic CSI-RS resource, the UE may use the RS resource contained in the default spatial relation info to measure downlink pathloss for determining transmit power of SRS resource. The default spatial relation info may be determined as a reference signal configured as QCL-type D in the TCI-state configured to the CORESET with a lowest ID in the active DL BWP. In other words, the spatial setting for the SRS resource is the same as a Transmission Configuration Indicator (TCI) state with a lowest index among the TCI-states activated for a Physical Downlink Shared Channel (PDSCH) reception, if COntrol REsource SET (CORESET) is not configured in a serving cell of the UE and the spatial setting for the SRS resource is default spatial relation information determined as a reference signal configured as QCL-type D in the TCI-state configured to the CORESET with the lowest index in the active DL BWP.

In addition, it is provided UE that is configured to perform one of the above methods.

Figure 2:
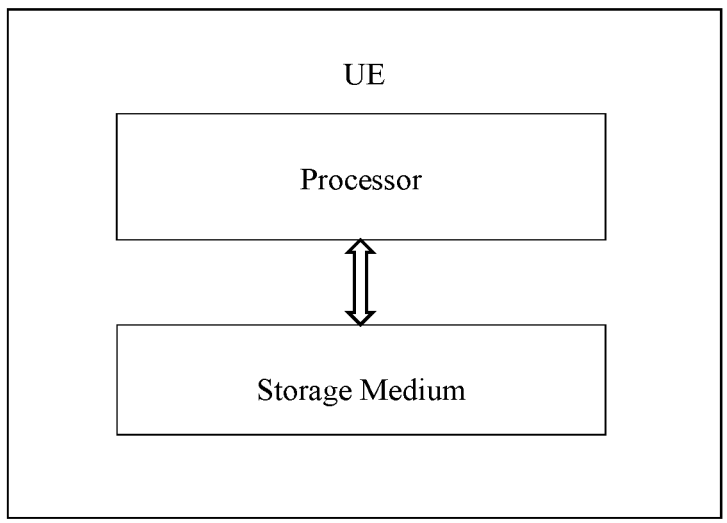
FIG. 2 shows an exemplary UE.

The UE may comprises one or more storage medium storing computer readable instructions, and one or more computing processors configured to excute the computer readable instructions for performing one of the above methods, as shown in FIG. 2 as an example.

The UE may comprise a plurality of modules, each module is configured to perform one or more of method steps to complete one of above methods.

It is provided a computer program, comprising instructions, when executed by user equipment, for causing the user equipment to perform one of the above methods.

It is provided a computer readable medium, comprising instructions for causing a user equipment to perform one of the above methods.

The following References may be helpful for understanding the present disclosure:

| | |
|---|---|
| [1] | 3GPP TS 38.211 V15.5.0: "NR; Physical channels and modulation" |
| [2] | 3GPP TS 38.212 V15.5.0: "NR; Multiplexing and channel coding" |
| [3] | 3GPP TS 38.213 V15.5.0: "NR; Physical layer procedures for control" |
| [4] | 3GPP TS 38.214 V15.5.0: "NR; Physical layer procedures for data" |
| [5] | 3GPP TS 38.215 V15.5.0: "NR; Physical layer measurements" |
| [6] | 3GPP TS 38.321 V15.5.0: "NR; Medium Access Control (MAC) protocol specification" |
| [7] | 3GPP TS 38.331 V15.5.0: "NR; Radio Resource Control (RRC) protocol specification" |

Some of the abbreviations used in this present disclosure are listed below:

| | |
|---|---|
| 3GPP | $3^{rd}$ Generation Partnership Project |
| 5G | $5^{th}$ Generation |
| NR | New Radio |
| gNB | Next generation NodeB |
| DL | Downlink |
| UL | Uplink |
| PUSCH | Physical Uplink Shared Channel |
| PUCCH | Physical Uplink Control Channel |
| PDSCH | Physical Downlink Shared Channel |
| PDCCH | Physical Downlink Control Channel |
| SRS | Sounding Reference Signal |
| CSI | Channel state information |
| CSI-RS | Channel state information reference signal |

| | |
|---|---|
| RS | Reference Signal |
| CORESET | Control Resource Set |
| DCI | Downlink control information |
| TRP | Transmission/reception point |
| ACK | Acknowledge |
| NACK | Non-Acknowledge |
| UCI | Uplink control information |
| RRC | Radio Resource Control |
| HARQ | Hybrid Automatic Repeat Request |
| MAC | Media Access Control |
| MAC CE | Media Access Control Control Element |
| CRC | Cyclic Redundancy Check |
| RNTI | Radio Network Temporary Identity |
| RB | Resource Block |
| PRB | Physical Resource Block |
| NW | Network |
| RSRP | Reference signal received power |
| L1-RSRP | Layer 1 Reference signal received power |
| TCI | Transmission Configuration Indicator |
| Tx | Transmission |
| Rx | Receive |
| QCL | Quasi co-location |
| SSB | SS/PBCH Block |
| SRI | SRS resource indicator |

CLAUSES

1. A method for determining a transmission power of an uplink transmission, comprising: determining, by a User Equipment (UE), a Reference Signal (RS) resource index providing a periodic RS resource; calculating, by the UE, a downlink pathloss estimate using the RS resource index; determining, by the UE, the transmission power of the uplink transmission based on the downlink pathloss estimate.

2. The method of clause 1, wherein the uplink transmission is a Sounding Reference Signal (SRS) transmission, the step of determining, by the UE, the RS resource index providing the periodic RS resource comprises: if the UE is not provided a pathloss reference configuration or an SRS pathloss reference configuration and is not provided spatial relation information for the SRS transmission, determining, by the UE, the RS resource index providing the periodic RS resource.

3. The method of clause 2, wherein the periodic RS resource is contained in a spatial setting for the SRS transmission.

4. The method of clause 2 or 3, wherein the spatial setting for the SRS transmission is default spatial relation information.

5. The method of any one of clauses 2 to 4, wherein the RS resource index provides the periodic RS resource with Quasi Co-Location (QCL)-TypeD.

6. The method of any one of clauses 2 to 5, wherein the pathloss reference configuration is a Radio Recourse Control (RRC) parameter pathlossReferenceRS for configuring a Channel State Information-Reference Signal (CSI-RS) resource index or a Synchronisation Signal/Physical Broadcast Channel (SS/PBCH) block index that provides a downlink RS resource index for the pathloss estimate.

7. The method of any one of clauses 2 to 6, wherein the SRS pathloss reference configuration is higher layer parameter SRS-pathlossReferenceRS for configuring an SRS resource.

8. The method of any one of clauses 2 to 7, wherein the spatial relation information is an RRC parameter spatialRelationInfo for configuring the spatial relation information for an SRS.

9. The method of any one of clauses 5 to 8, wherein the RS resource index providing the periodic RS resource is in an active Physical Downlink Shared Channel Transmission Configuration Indicator (PDSCH TCI) state with a lowest index in an active Downlink Bandwidth Part (DL BWP), if COntrol REsource SET (CORESET) is not provided in the active DL BWP of a serving cell of the UE.

10. The method of any one of clauses 5 to 9, wherein the step of determining, by the UE, the RS resource index providing the periodic RS resource comprises: if the RS resource index contained in a spatial setting for an SRS resource is a periodic CSI-RS, the UE uses the RS resource index contained in the spatial setting for the SRS transmission.

11. The method of clause 10, wherein the spatial setting for the SRS resource is the same as a Transmission Configuration Indicator (TCI) state with a lowest index among the TCI-states activated for a Physical Downlink Shared Channel (PDSCH) reception, if COntrol REsource SET (CORESET) is not configured in a serving cell of the UE.

12. The method of clause 10 or 11, wherein the spatial setting for the SRS resource is default spatial relation information determined as a reference signal configured as QCL-type D in the TCI-state configured to the CORESET with the lowest index in the active DL BWP.

13. The method of any one of clauses 9 to 12, wherein no CORESET is configured for Physical Downlink Control Channel (PDCCH) monitoring in the serving cell.

14. The method of any one of clauses 5 to 13, wherein the RS resource index providing the periodic RS resource is in a Transmission Configuration Indicator (TCI) state or a QCL assumption of a COntrol REsource SET (CORESET) with a lowest index, if the CORESET is configured in a serving cell of the UE.

15. The method of any one of clauses 5 to 14, wherein the step of determining, by the UE, the RS resource index providing the periodic RS resource comprises: if the RS resource index contained in a spatial setting for an SRS resource is a periodic CSI-RS, the UE uses the RS resource index contained in the spatial setting for the SRS transmission.

16. The method of clause 15, wherein the spatial setting for the SRS resource is the same as a TCI state or a QCL assumption for the CORESET with lowest index.

17. The method of clause 15 or 16, wherein the spatial setting for the SRS resource is default spatial relation information determined as a reference signal configured as QCL-type D in the TCI-state configured to the CORESET with the lowest index.

18. The method of any one of clauses 14 to 17, wherein the RS resource index providing the periodic RS resource is in the TCI state or the QCL assumption of the CORESET with the lowest index in an active Downlink Bandwidth Part (DL BWP).

19. The method of any one of clauses 14 to 18, wherein the RS resource index providing the periodic RS resource is in the TCI state or the QCL assumption of the CORESET with the lowest index in a most recent monitored DL slot.

20. The method of clause 1, wherein the uplink transmission is a Physical Uplink Control CHannel (PUCCH) transmission, the step of determining, by the UE, the RS resource index providing the periodic RS resource comprises: if the UE is not provided a pathloss reference configuration and is not provided PUCCH spatial relation information, determining, by the UE, the RS resource index providing the periodic RS resource.

21. The method of clauses 20, wherein the periodic RS resource is contained in a spatial setting for the PUCCH transmission.

22. The method of clause 20 or 21, wherein the spatial setting for the PUCCH transmission is default spatial relation information.

23. The method of any one of clauses 20-22, wherein the RS resource index provides the periodic RS resource with Quasi Co-Location (QCL)-TypeD.

24. The method of any one of clauses 20 to 23, wherein the pathloss reference configuration is a Radio Recourse Control (RRC) parameter pathlossReferenceRS for configuring a Channel State Information-Reference Signal (CSI-RS) resource index or a Synchronisation Signal/Physical Broadcast Channel (SS/PBCH) block index that provides a downlink RS resource index for the pathloss estimate.

25. The method of any one of clauses 20 to 24, wherein the PUCCH spatial relation information is a Radio Recourse Control (RRC) parameter PUCCH-SpatialRelationInfo used to provide a reference signal that provides spatial relation information and a downlink reference signal that provides a path loss reference signal for the PUCCH resource.

26. The method of any one of clauses 23 to 25, wherein the RS resource index providing the periodic RS resource is in a Transmission Control Indicator (TCI) state or a QCL assumption of a COntrol REsource SET (CORESET) with a lowest index.

27. The method of any one of clauses 23 to 26, wherein the step of determining, by the UE, the RS resource index providing the periodic RS resource comprises: if the RS resource index contained in a spatial setting for a PUCCH transmission is a periodic CSI-RS, the UE uses the RS resource index contained in the spatial setting for the PUCCH transmission.

28. The method of clause 27, wherein the spatial setting for the PUCCH transmission is the same as a TCI state or a QCL assumption for the CORESET with lowest index.

29. The method of clause 27 or 28, wherein the spatial setting for the PUCCH transmission is default spatial relation information determined as a reference signal configured as QCL-type D in the TCI-state configured to the CORESET with the lowest index.

30. The method of any one of clauses 26 to 29, wherein the RS resource index providing the periodic RS resource is in the TCI state or the QCL assumption of the CORESET with the lowest index in an active Downlink Bandwidth Part (DL BWP).

31. The method of any one of clauses 26 to 30, wherein the RS resource index providing the periodic RS resource is in the TCI state or the QCL assumption of the CORESET with the lowest index in a most recent monitored DL slot.

32. The method of any of the preceding clauses, wherein the periodic RS source is for a Channel State Information-RS (CSI-RS).

33. User equipment (UE), configured to perform the method of any of the preceding clauses.

34. The user equipment of clause 33, comprising one or more storage medium storing computer readable instructions, and one or more computing processors configured to execute the computer readable instructions for performing the method of any one of clauses 1 to 32.

35. A computer program, comprising instructions, when executed by user equipment, for causing the user equipment to perform the method according to any one of clauses 1 to 32.

36. A computer readable medium, comprising instructions for causing a user equipment to perform the method of any one of clauses 1 to 32.

It should be understood that the disclosure is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:
1. A method for determining a transmission power of an uplink transmission, comprising:
 determining, by a User Equipment (UE), a Reference Signal (RS) resource index providing a periodic RS resource;
 calculating, by the UE, a downlink pathloss estimate using the RS resource index;
 determining, by the UE, the transmission power of the uplink transmission based on the downlink pathloss estimate,
 wherein:
 either
 the uplink transmission is a Sounding Reference Signal (SRS) transmission,
 determining, by the UE, the RS resource index providing the periodic RS resource comprises:
 if the UE is not provided a pathloss reference configuration or an SRS pathloss reference configuration and is not provided spatial relation information for the SRS transmission,
 determining, by the UE, the RS resource index providing the periodic RS resource,
 wherein the periodic RS resource is contained in a spatial setting for the SRS transmission,
 the spatial setting for the SRS transmission is default spatial relation information,
 the pathloss reference configuration is a Radio Recourse Control (RRC) parameter pathlossReferenceRS for configuring a Channel State Information-Reference Signal (CSI-RS) resource index or a Synchronisation Signal/Physical Broadcast Channel (SS/PBCH) block index that provides a downlink RS resource index for the pathloss estimate,
 the SRS pathloss reference configuration is higher layer parameter SRS-pathlossReferenceRS for configuring an SRS resource, and
 the spatial relation information is an RRC parameter spatialRelationInfo for configuring the spatial relation information for an SRS;
 or
 the uplink transmission is a Physical Uplink Control Channel (PUCCH) transmission,
 determining, by the UE, the RS resource index providing the periodic RS resource comprises:
 if the UE is not provided a pathloss reference configuration and is not provided PUCCH spatial relation information,
 determining, by the UE, the RS resource index providing the periodic RS resource,
 wherein the periodic RS resource is contained in a spatial setting for the PUCCH transmission,
 the spatial setting for the PUCCH transmission is default spatial relation information,
 the pathloss reference configuration is a RRC parameter pathlossReferenceRS for configuring a CSI-RS resource index or a SS/PBCH block index that provides a downlink RS resource index for the pathloss estimate, and the PUCCH spatial relation information is a RRC parameter PUCCH-SpatialRelationInfo used to provide a reference signal that provides spatial relation information and a downlink reference signal that provides a path loss reference signal for the PUCCH resource.

2. The method of claim 1, wherein
the RS resource index provides the periodic RS resource with Quasi Co-Location (QCL)-TypeD.

3. The method of claim 1, wherein:
when the uplink transmission is the SRS transmission, the RS resource index providing the periodic RS resource is in an active Physical Downlink Shared Channel Transmission Configuration Indicator (PDSCH TCI), state with a lowest index in an active Downlink Bandwidth Part (DL BWP) if COntrol REsource SET (CORESET) is not provided in the active DL BWP of a serving cell of the UE; and
when the uplink transmission is the PUCCH transmission, the RS resource index providing the periodic RS resource is in a TCI state or a QCL assumption of a CORESET with a lowest index.

4. The method of claim 3, wherein
when the uplink transmission is the SRS transmission, no CORESET is configured for Physical Downlink Control Channel (PDCCH) monitoring in the serving cell.

5. The method of claim 1, wherein:
when the uplink transmission is the SRS transmission, the step of determining, by the UE, the RS resource index providing the periodic RS resource further comprises:
if the RS resource index contained in a spatial setting for an SRS resource is a periodic CSI-RS, the UE uses the RS resource index contained in the spatial setting for the SRS transmission; and
when the uplink transmission is the PUCCH transmission, the step of determining, by the UE, the RS resource index providing the periodic RS resource further comprises:
if the RS resource index contained in a spatial setting for a PUCCH transmission is a periodic CSI-RS, the UE uses the RS resource index contained in the spatial setting for the PUCCH transmission.

6. The method of claim 5, wherein:
when the uplink transmission is the SRS transmission, the spatial setting for the SRS resource is the same as a Transmission Configuration Indicator (TCI) state with a lowest index among the TCI-states activated for a Physical Downlink Shared Channel (PDSCH) reception, if Control REsource SET (CORESET) is not configured in a serving cell of the UE; and
when the uplink transmission is the PUCCH transmission, the spatial setting for the PUCCH transmission is the same as a TCI state or a QCL assumption for the CORESET with lowest index.

7. The method of claim 5, wherein:
when the uplink transmission is the SRS transmission, the spatial setting for the SRS resource is default spatial relation information determined as a reference signal configured as QCL-type D in the TCI-state configured to the CORESET with the lowest index in the active DL BWP; and
when the uplink transmission is the PUCCH transmission, the spatial setting for the PUCCH transmission is default spatial relation information determined as a reference signal configured as QCL-type D in the TCI-state configured to the CORESET with the lowest index.

8. The method of claim 1, wherein:
when the uplink transmission is the SRS transmission, the RS resource index providing the periodic RS resource is in a Transmission Configuration Indicator (TCI) state or a QCL assumption of a COntrol REsource SET (CORESET) with a lowest index, if the CORESET is configured in a serving cell of the UE; and
when the uplink transmission is the PUCCH transmission, the RS resource index providing the periodic RS resource is in the TCI state or the QCL assumption of the CORESET with the lowest index in an active Downlink Bandwidth Part (DL BWP).

9. The method of claim 8, wherein: when the uplink transmission is the SRS transmission, the spatial setting for the SRS resource is the same as a TCI state or a QCL assumption for the CORESET with lowest index, or
the spatial setting for the SRS resource is default spatial relation information determined as a reference signal configured as QCL-type D in the TCI-state configured to the CORESET with the lowest index.

10. The method of claim 8, wherein:
the RS resource index providing the periodic RS resource is in the TCI state or the QCL assumption of the CORESET with the lowest index in an active Downlink Bandwidth Part (DL BWP); or
the RS resource index providing the periodic RS resource is in the TCI state or the QCL assumption of the CORESET with the lowest index in a most recent monitored DL slot.

11. The method of claim 1, wherein the periodic RS source is for a Channel State Information-RS (CSI-RS).

12. The UE of claim 11, wherein
the RS resource index provides the periodic RS resource with Quasi Co-Location (QCL)-TypeD.

13. User equipment (UE), comprising a processor and a memory, wherein the processor is configured to determine a Reference Signal (RS) resource index providing a periodic RS resource; calculate a downlink pathloss estimate using the RS resource index; and determine a transmission power of an uplink transmission based on the downlink pathloss estimate,
wherein:
either
the uplink transmission is a Sounding Reference Signal (SRS) transmission,
wherein the processor is further configured to:
determine the RS resource index providing the periodic RS resource, if the UE is not provided a pathloss reference configuration or an SRS pathloss reference configuration and is not provided spatial relation information for the SRS transmission,
wherein the periodic RS resource is contained in a spatial setting for the SRS transmission,
the spatial setting for the SRS transmission is default spatial relation information,
the pathloss reference configuration is a Radio Recourse Control (RRC) parameter pathlossReferenceRS for configuring a Channel State Information-Reference Signal (CSI-RS) resource index or a Synchronisation Signal/Physical Broadcast Channel (SS/PBCH) block index that provides a downlink RS resource index for the pathloss estimate, the SRS pathloss reference configuration is higher layer parameter SRS-pathlossReferenceRS for configuring an SRS resource, and the spatial relation information is an RRC parameter spatialRelationInfo for configuring the spatial relation information for an SRS;

or the uplink transmission is a Physical Uplink Control Channel (PUCCH) transmission, wherein the processor is further configured to:

determine the RS resource index providing the periodic RS resource, if the UE is not provided a pathloss reference configuration and is not provided PUCCH spatial relation information, wherein the periodic RS resource is contained in a spatial setting for the PUCCH transmission, the spatial setting for the PUCCH transmission is default spatial relation information, the pathloss reference configuration is a Radio Recourse Control (RRC) parameter pathlossReferenceRS for configuring a Channel State Information-Reference Signal (CSI-RS) resource index or a Synchronisation Signal/Physical Broadcast Channel (SS/PBCH) block index that provides a downlink RS resource index for the pathloss estimate, and the PUCCH spatial relation information is a Radio Recourse Control (RRC) parameter PUCCH-Spatial-RelationInfo used to provide a reference signal that provides spatial relation information and a downlink reference signal that provides a path loss reference signal for the PUCCH resource.

14. The UE of claim 13, wherein:

when the uplink transmission is the SRS transmission, the RS resource index providing the periodic RS resource is in an active Physical Downlink Shared Channel Transmission Configuration Indicator (PDSCH TCI) state with a lowest index in an active Downlink Bandwidth Part, DL BWP, if COntrol REsource SET (CORESET) is not provided in the active DL BWP of a serving cell of the UE; and when the uplink transmission is the PUCCH transmission, the RS resource index providing the periodic RS resource is in a TCI state or a QCL assumption of a CORESET with a lowest index.

15. The UE of claim 14, wherein:

when the uplink transmission is the SRS transmission, no CORESET is configured for Physical Downlink Control Channel (PDCCH) monitoring in the serving cell.

16. The UE of claim 13, wherein:

when the uplink transmission is the SRS transmission, the processor is further configured to:

use the RS resource index contained in the spatial setting for the SRS transmission, if the RS resource index contained in a spatial setting for an SRS resource is a periodic CSI-RS; and when the uplink transmission is the PUCCH transmission, the processor is further configured to:

use the RS resource index contained in the spatial setting for the PUCCH transmission, if the RS resource index contained in a spatial setting for a PUCCH transmission is a periodic CSI-RS.

17. The UE of claim 16, wherein:

when the uplink transmission is the SRS transmission, the spatial setting for the SRS resource is the same as a Transmission Configuration Indicator (TCI) state with a lowest index among the TCI-states activated for a Physical Downlink Shared Channel (PDSCH) reception, if COntrol REsource SET (CORESET) is not configured in a serving cell of the UE; and when the uplink transmission is the PUCCH transmission, the spatial setting for the PUCCH transmission is the same as a TCI state or a QCL assumption for the CORESET with lowest index.

18. The UE of claim 16, wherein:

when the uplink transmission is the SRS transmission, the spatial setting for the SRS resource is default spatial relation information determined as a reference signal configured as QCL-type D in the TCI-state configured to the CORESET with the lowest index in the active DL BWP; and when the uplink transmission is the PUCCH transmission, the spatial setting for the PUCCH transmission is default spatial relation information determined as a reference signal configured as QCL-type D in the TCI-state configured to the CORESET with the lowest index.

19. The UE of claim 13, wherein:

when the uplink transmission is the SRS transmission, the RS resource index providing the periodic RS resource is in a Transmission Configuration Indicator (TCI) state or a QCL assumption of a COntrol REsource SET (CORESET) with a lowest index, if the CORESET is configured in a serving cell of the UE; and when the uplink transmission is the PUCCH transmission, the RS resource index providing the periodic RS resource is in the TCI state or the QCL assumption of the CORESET with the lowest index in an active Downlink Bandwidth Part (DL BWP).

20. The UE of claim 19, wherein:

when the uplink transmission is the SRS transmission, the spatial setting for the SRS resource is the same as a TCI state or a QCL assumption for the CORESET with lowest index, or the spatial setting for the SRS resource is default spatial relation information determined as a reference signal configured as QCL-type D in the TCI-state configured to the CORESET with the lowest index.

* * * * *